Patented Aug. 24, 1948

2,447,914

UNITED STATES PATENT OFFICE 2,447,914

PROCESS FOR MAKING ALKALI CELLULOSE

Andreas Ruperti, Arlesheim, near Basel, Switzerland, assignor to Ciba Limited, a Swiss firm No Drawing. Application June 20, 1944, Serial No. 541,285. In Switzerland July 2, 1943

8 Claims. (Cl. 260—233)

It is known that cellulose ethers are produced nearly exclusively from alkali cellulose, the manufacture of which forms the subject of numerous patents.

To produce highly etherified cellulose ethers which are soluble in organic solvents and insoluble in water, it is necessary to start from an alkali cellulose rich in alkali.

If, however, cellulose ethers etherified only to a low degree are to be produced which are soluble in water but insoluble in organic solvents, an alkali cellulose containing smaller quantities of alkali is to be used.

In both cases it is advantageous to start from alkali cellulose with low water content, as undesired side-reactions are restrained by reducing the quantity of water present during the etherification.

In order to obtain alkali cellulose poor in water but rich in alkali for the purpose of producing highly etherified cellulose ether, very large quantities of alkali in presence of little water must be uniformly incorporated into the cellulose. When cellulose is directly mechanically mixed with water and more alkali than can be dissolved in the quantity of water present, an alkali cellulose is formed, the uniformity of which leaves much to be desired. It has therefore already been proposed to use over-concentrated solutions of caustic alkali at temperatures at which they are still liquid; work has thus been carried out, for example, with caustic soda solution of 70 per cent. strength at 66° C. Owing to the tendency of these over-concentrated solutions to solidify on the slightest cooling and to form solid precipitates in the cellulose as well as in various parts of the apparatus, this method of working requires a complicated apparatus which can be heated throughout, and it can therefore be carried out only with difficulty.

If an excess of caustic alkali is not desired and an alkali cellulose is to be formed which is of low water content and simultaneously of low alkali content, difficulties are encountered which are due to the fact that cellulose swells strongly immediately on coming into contact with aqueous solutions of caustic alkali. Over a large range of concentrations about double the quantity of alkaline solution or even more is actually absorbed by the cellulose under normal conditions of working, and this proportion alkali-water-cellulose cannot be reduced at will by subsequent pressing or other mechanical means. When working, for example, in known manner, by immersing the cellulose in an excess of aqueous solution of caustic alkali without special precautions being taken, in most cases, owing to the swelling, it is impossible to obtain the desired proportion alkali-water-cellulose by pressing. To obtain the said proportion cellulose-alkali-water, it is rather necessary to evaporate the water or restrain swelling of the cellulose by special means, for example by addition of alcohol. Immersing the cellulose in dilute solution of caustic alkali, combined with subsequent concentration by evaporating the excess water, does not yield favorable results in etherification; apart from this, the necessity of evaporating the water from the alkali-cellulose constitutes an essential economical disadvantage. Working with addition of alcohol is, of course, still less economical. If the cellulose be converted into alkali cellulose of low water and relative low alkali contents without the application of an excess of solution of caustic alkali, for example, by mixing cellulose directly with an insufficient quantity, for example with the same weight of alkaline solution, a suitable alkali cellulose is not obtained, because the cellulose particles first wetted absorb the alkaline solution while swelling and do not release it, or release it only with difficulty, to the neighbouring particles, so that an alkali cellulose is formed which is non-homogeneous. For this reason it has also been proposed to treat cellulose with suspensions or emulsions of solid or dissolved alkali in organic solvents under strong mechanical action, in order to obtain a uniform distribution. Such measures are of course highly uneconomical.

It has now been found that it is possible in a surprisingly simple and cheap manner to obtain an alkali cellulose of low water content which is very suitable for the manufacture of cellulose ethers, by treating cellulose with a concentrated aqueous solution of caustic alkali under such conditions that wetting takes place more rapidly than swelling, the soaked cellulose being separated from the excess alkaline solution when wetting is complete and before complete swelling has taken place. Such conditions prevail, for example when cellulose is immersed in a concentrated aqueous solution of caustic alkali at a raised temperature for a short time, the excess alkali being squeezed off immediately subsequent to the immersion. In view of the fact that swelling is reduced by working at a raised temperature, wetting, however, being accelerated, it is possible by selecting suitable conditions with regard to temperature, duration of immersion and alkali content of the solution, to produce uniform alkali cellulose having a very favorable proportion of cellulose-water-alkali. The new method is particularly suitable for use in making alkali cellulose for the production of relatively low etherified cellulose ethers soluble in alkali or water, but insoluble in organic solvents, since they are economically best produced in the presence of small quantities of concentrated alkali solution, for example, of 30–50 per cent. strength.

As material which is to be treated there comes into consideration cellulose, for example pulp from wood, straw, bagasse, cotton linters or any other cellulose sources, in any form, for instance in loose form but especially in the form of sheets, preferably continuous pulp sheets.

Depending on the desired stage of etherification, the alkali solution is applied in a concentration of about 20 per cent. up to a concentration at which the solution is still liquid at room temperature, i. e. about 50%. There can be used caustic soda solution as well as caustic potash solution, the former being more advantageous from the economical point of view; it is applied preferably as a solution of 30–50 per cent. strength.

The term "at a raised temperature" as used in the application means a temperature varying between a temperature not essentially below 60° C. and about 90° C.; a temperature between 60 to 80° C. has proved most suitable in a passage lasting only a few seconds.

The duration of the treatment depends greatly on the temperature and on the concentration of the solution, as well as on the constitution and the moisture content of the cellulose; the treatment has to last only for a short time and may vary between about ½ and 20 seconds.

The wetting can be controlled empirically: incompletely wetted cellulose exhibits inside the sheets lighter colored spots, which have remained dry, and can be ascertained by tearing the sheet into pieces. The swelling can be controlled by weighing a sample of the impregnated sheet or titrating the alkali absorbed.

The present process is preferably carried out as a continuous process, the wood pulp, supplied as a roll being passed for a short distance through the solution in a foulard-like machine and subsequently squeezed off.

The following examples illustrate the invention:

Example 1

Bleached sulfite cellulose in rolls is treated at 60–70° C. in a foulard with caustic soda solution of 40 per cent. strength, and pressed to double its weight, the passage through the caustic soda solution lasting 3 seconds. The pressed alkali cellulose is torn into pieces in a shredder which is connected with the foulard, and used for example for the manufacture of a water-soluble methyl- or carboxymethyl cellulose. Etherification can be effected with very efficient usage of etherifying agent.

Example 2

500 parts of sulfite cellulose in rolls are passed at 80° C. through a bath containing caustic soda solution of 50 per cent. strength and subsequently pressed to 1200 parts by weight, the passage through the caustic soda solution lasting 5–6 seconds.

The alkali cellulose thus obtained is mixed in a closed shredder with 700 parts of solid caustic soda at 90° C. until a completely homogeneous product is formed. This is cooled to room temperature during further shredding. The alkali cellulose is obtained in the form of coarse grit and is especially suitable for example for the manufacture of ethyl cellulose soluble in organic solvents.

What I claim is:

1. Process for the manufacture of alkali cellulose of low water and alkali content suitable for the production of cellulose ethers by contacting cellulose at a temperature of 60–90° C. for ½ to 20 seconds with a concentrated aqueous solution of caustic alkali of a concentration at which the solution is still liquid at room temperature, and squeezing out the excess alkaline solution from the resultant soaked cellulose when wetting is complete and before complete swelling has taken place.

2. Process for the manufacture of alkali cellulose of low water and alkali content suitable for the production of cellulose ethers by contacting cellulose in form of a sheet at a temperature of 60–90° C. for ½ to 20 seconds with a concentrated aqueous solution of caustic alkali of a concentration at which the solution is still liquid at room temperature, and squeezing out the excess alkaline solution from the resultant soaked cellulose when wetting is complete and before complete swelling has taken place.

3. Process for the manufacture of alkali cellulose of low water and alkali content suitable for the production of cellulose ethers by contacting cellulose in form of a continuous sheet at a temperature of 60–90° C. for ½ to 20 seconds with a concentrated aqueous solution of caustic alkali of a concentration at which the solution is still liquid at room temperature, and squeezing out the excess alkaline solution from the resultant soaked cellulose when wetting is complete and before complete swelling has taken place.

4. Process for the manufacture of alkali cellulose of low water and alkali content suitable for the production of cellulose ethers by contacting cellulose in form of a continuous sheet at a temperature of 60–90° C. for ½ to 20 seconds with a concentrated aqueous caustic soda solution of a concentration at which the solution is still liquid at room temperature, and squeezing out the excess alkaline solution from the resultant soaked cellulose when wetting is complete and before complete swelling has taken place.

5. Process for the manufacture of alkali cellulose of low water and alkali content suitable for the production of cellulose ethers by contacting cellulose in form of a continuous sheet at a temperature of 60–90° C. for ½ to 20 seconds with a concentrated aqueous caustic soda solution of 40% strength, and squeezing out the excess alkaline solution from the resultant soaked cellulose when wetting is complete and before complete swelling has taken place.

6. Process for the manufacture of alkali cellulose of low water and alkali content suitable for the production of cellulose ethers by contacting cellulose in form of a continuous sheet at 70° C. for ½ to 20 seconds with a concentrated aqueous caustic soda solution of 40% strength, and squeezing out the excess alkaline solution from the resultant soaked cellulose when wetting is complete and before complete swelling has taken place.

7. Process for the manufacture of alkali cellulose of low water and alkali content suitable for the production of cellulose ethers by contacting cellulose in form of a continuous sheet at 70° C. for 3 seconds with a concentrated aqueous caustic soda solution of 40% strength, and squeezing out the excess alkaline solution from the resultant soaked cellulose when wetting is complete and before complete swelling has taken place.

8. Process for the manufacture of alkali cellulose of low water and alkali content suitable for the production of cellulose ethers by contacting cellulose in form of a continuous sheet at 80° C. for 5 seconds with a concentrated aqueous caustic soda solution of 50% strength, and squeezing out the excess alkaline solution from the resultant soaked cellulose when wetting is complete and before complete swelling has taken place.

ANDREAS RUPERTI.

REFERENCES CITED

The following references are of record in the file of this patent:

UNITED STATES PATENTS

| Number | Name | Date |
|---|---|---|
| 1,569,692 | Van Weyenbergh | Jan. 12, 1926 |
| 2,143,863 | Collings et al. | Jan. 17, 1939 |
| 2,145,862 | Collings et al. | Feb. 7, 1939 |